May 9, 1950 E. F. HENSLEY 2,506,960
AIRCRAFT CONTROL MECHANISM
Filed March 13, 1947
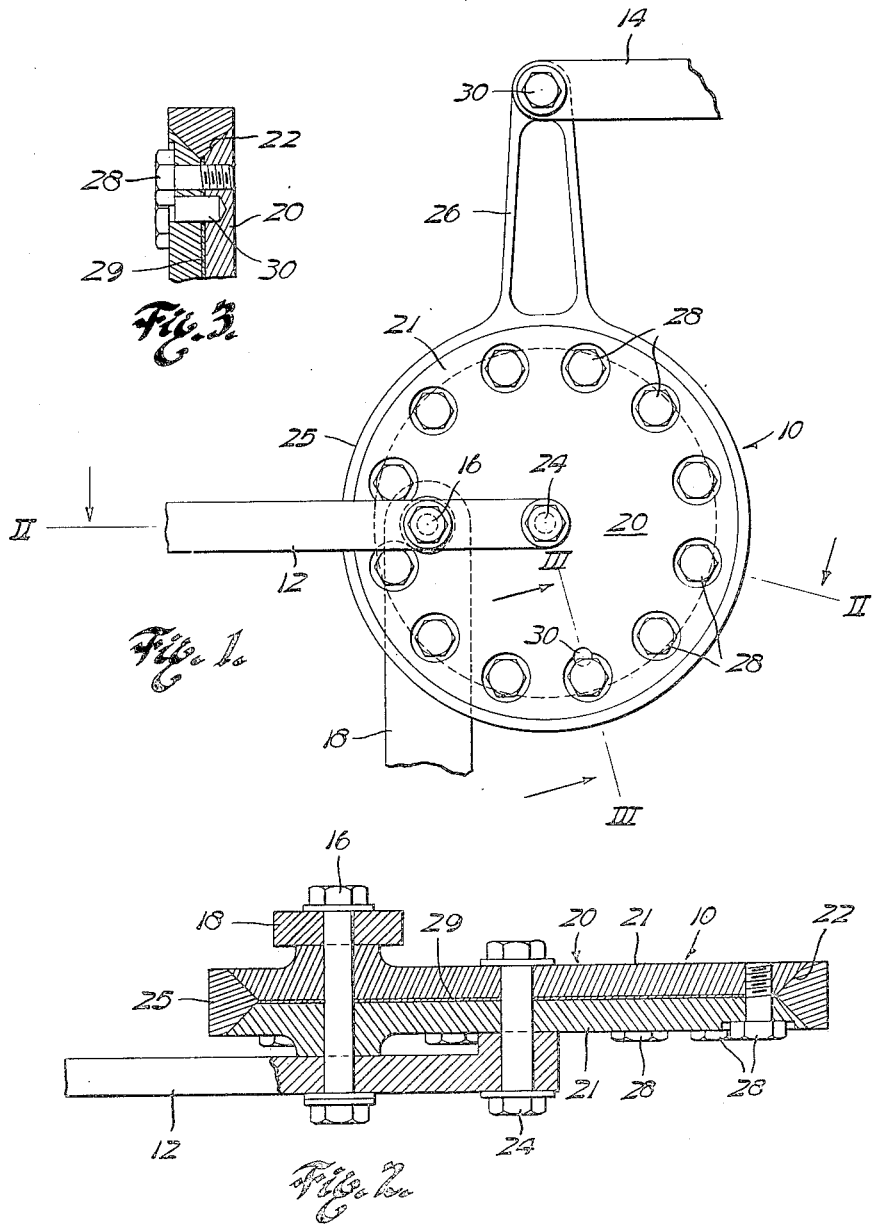
INVENTOR
Edward F. Hensley
BY
Bean, Brooks, Buckley & Bean.
ATTORNEYS Patented May 9, 1950

2,506,960

UNITED STATES PATENT OFFICE 2,506,960

AIRCRAFT CONTROL MECHANISM

Edward F. Hensley, Niagara Falls, N. Y., assignor to Bell Aircraft Corporation, Wheatfield, N. Y.

Application March 13, 1947, Serial No. 734,459

2 Claims. (Cl. 74—469)

This invention relates to improvements in aircraft control devices, and more particularly to an improved form of a device adapted to be incorporated in a push-pull type pilot controlled system so as to render the system "irreversible" in the sense that forces exerted against the controlled member and tending to "feed back" against the pilot control member are successively resisted by the device. Thus, displacements of the elements of the control system occur only in directions sought for by pilot manipulations of the control system.

The present invention is designed particularly for use in aircraft control systems wherein no appreciable "lost motion" in the system may be tolerated, such as the rotor blade pitch control systems in helicopter aircraft or the like. In fact, the present invention is specifically designed for use in connection with the usual push-pull control mechanisms in helicopter aircraft which regulate the pitch attitudes of the helicopter rotor blades, and is particularly useful therein because of the fact that it provides a structurally simple and rugged "irreversible" control unit which is adapted to function efficiently and to remain free of lost motion effects despite service wearing of the relatively moving parts. By contrast, the so-called "cam type" irreversible mechanisms of the prior art are unsuited for the stated purposes because of their tendencies to introduce lost motion effects in such control systems upon slightest wearing of the relatively movable parts; and as is well known in the helicopter art disastrous flutter and vibration effects invariably develop in rotor systems whenever the blade pitch control devices thereof include any appreciable degree of slackness.

It is therefore an object of the present invention to provide an improved "irreversible" pilot-operable gear mechanism for use in aircraft control systems and the like. Another object of the invention is to provide an improved gear of the character described wherein the relatively moving parts are so formed and arranged as to obviate lost motion effects therein despite service wearing of the relatively moving parts and to be readily adjustable to compensate for wear and the like. Other objects and advantages of the invention will appear in the specification hereinafter.

In the drawing:

Fig. 1 is a side elevation of a gear device of the invention;

Fig. 2 is a section, on a larger scale, taken along line II—II of Fig. 1; and

Fig. 3 is a fragmentary section taken along line III—III of Fig. 1.

The drawing illustrates the invention in the form of a gear mechanism designated generally at 10 and illustrated as being arranged to interconnect a pilot-operable lever 12 and a controlled lever 14; it being understood that the lever 14 may comprise a portion of the mechanism for adjusting the position of any aircraft controlled member, such as the swash plate control mechanism of a helicopter for regulating the pitch adjustments of the helicopter rotor blades. Likewise, the control member 12 may comprise any portion of a pilot-operable mechanism which may be actuated by the aircraft pilot in such manner as to rock the lever 12 about a pivot device 16 which is carried by a fixed bracket portion 18 of the aircraft frame.

The irreversible gear of the invention comprises a disc member 20 which is peripherally grooved to V-shaped cross section as indicated at 22, and the disc is mounted upon the fixed bracket 18 by means of the pivot pin 16 so as to be pivotable about an axis which is eccentric of the geometric center of the disc. The pilot-operable lever 12 is fixed at its inner end to the disc member 20 by means of a bolt 24; and thus it will be seen that upon pilot rocking of the lever 12 around the pivot pin 16 the disc 20 will also pivot thereon about an axis which is spaced to one side of the center of the disc. Thus, pivoting of the lever 12 will result in bodily displacement of the disc 20 in an oscillating path incidental to partial rotation of the disc about the pivot pin 16; the major axis of the oscillatory movement of the disc being directed vertically as viewed in Fig. 1.

The disc 20 is encircled by a ring member 25 which is internally shaped to a wedge-like sectional form so as to interfit with the V-shaped groove portion 22 of the disc member 20; and the ring member 25 includes a strut or arm portion 26 which is formed integrally therewith to extend radially relative to the geometric center (as viewed in Fig. 1) of the ring and disc unit. For convenience in construction and assembly of the parts, the disc member 20 is formed of a pair of circular plates 21—21 which are bolted together in side-by-side relation as by means of studs 28; the plates being oppositely edge-bevelled so as to provide the prescribed V-shaped groove effect therebetween when the plates are bolted together. Thus, the unit may be readily assembled by positioning the ring 25 between the plates before they are bolted together.

The gear of the invention may then be mounted upon the bracket 18 by means of the pivot pin 16 and connected to the lever 12; and the arm 26 is pivotally connected to the lever member 14 as by means of a bolt 30. Thereupon any rocking of the lever 12 will cause the disc member 20 to oscillate about the axis of the pin 16, thereby causing corresponding displacements of the ring arm unit 25—26 in vertical directions as viewed in Fig. 1. Thus, the lever 14 will be correspondingly rocked for transmission of control effects to the aircraft operating controls, such as for example, the rotor blade pitch change control swash plate. Incidental to such transmission of control effects through the gear device of the invention, the disc member 20 will necessarily rotate slightly within the ring 25; but the frictional resistance to such relative movements of the ring disc members will be readily overcome by the reason of the mechanical advantage factor of the lever 12 relative to the disc-ring mechanism.

Thus, pilot imposed displacements of the lever 12 will be substantially unopposed by the internal operation of the gear of the invention; whereas whenever forces on the aircraft control elements feed back through the lever 14 into the gear, they are effectively opposed by the mechanical disadvantage under which they are forced to operate in being transmitted through the gear of the invention.

Obviously, any motion transmitting gear employing relatively moving parts necessarily experiences certain degrees of wearing away of such parts, and in order to prevent "lost motion" effects from being introduced into such a control system it is required to prevent such wearing of the relatively moving surfaces to be accompanied by sloppiness of the juncture therebetween. This object is attained in the case of the present invention by reason of the fact that the disc and ring members 20—25 are of complementary V-shaped section, whereby the mutually contacting surfaces thereof are of larger area dimensions than if they were of simple flatwise form. A shim 29 is preferably disposed between the disc parts 21—21 to suitably spread the latter so as to properly fit the ring 25. Then as the parts become worn in service the shim 29 may be replaced by successively thinner shims so as to maintain a proper fit condition. Thus, the gear of the invention is adapted to be readily adjusted whenever wearing thereof dictates, and it is therefore possible to maintain the gear in lost motion free condition; whereas flat-surfaced cam type gear arrangements for similar purposes would require replacement under short intervals of service. A dowel pin 30 is preferably mounted in one of the plates 21 so as to slip-fit into the opposite plate when the disc unit is assembled, so as to make certain that the disc plate members 21—21 will always be reassembled in the same positional relationship.

It will be understood that the features and advantages of the invention are obtained through use of a mechanical arrangement which is of utmost structural simplicity, and such as may be produced by relatively simple and inexpensive manufacturing operations, while contributing substantially to the safety and trouble-free operation of vehicle aircraft and the like. It will also be understood that only one specific form of the invention has been shown and described in detail, it will be apparent to those skilled in the art that the invention is not so limited but that various changes may be made therein without departing from the spirit of the invention or the scope of the appended claims.

I claim:

1. In an aircraft, an irreversible gear in the control mechanism of said aircraft, said gear comprising a pair of oppositely edge-bevelled plates bolted together with a shim therebetween to form a disc member, pin means mounting said disc member eccentrically of the geometric center thereof for oscillative movements, a pilot-operable device, including a lever pivotably mounted upon said pin means and having an end portion extending to the geometric center of said disc member, pivot means connecting said end of said lever to said disc at the center thereof whereby said disc is rotatable on said pivot means, a ring member encircling said disc member and in frictional engagement therewith, and pivotable connection means carried by said ring member for connection to the aircraft mechanism to be controlled, said disc and ring members having complementary frictionally contacting surfaces of V-shaped sectional form interfitting and forming the relatively moving surface portions of said members upon oscillations of said disc member about its pivotable mounting.

2. A motion transmitting gear for use in aircraft control devices and the like, comprising a circular disc member, mounting means engaging said disc member eccentrically of the geometric center thereof for pivoting upon said mounting means, a control lever pivotably mounted upon said mounting means and extending therefrom into pivotal connection with said disc member at a position spaced from said mounting means, and a ring member encircling said disc member and having a radially extending arm portion arranged to be pivotably connected to the mechanism to be controlled, said disc member and said ring member having complementary frictionally contacting surfaces of V-shaped sectional form interfitting and forming the relatively moving surface portions of said members upon oscillations of said disc member about said mounting means.

EDWARD F. HENSLEY.

REFERENCES CITED

The following references are of record in the file of this patent:

UNITED STATES PATENTS

| Number | Name | Date |
|---|---|---|
| 669,962 | Shaw | Mar. 12, 1901 |
| 1,178,380 | Bruce | Apr. 4, 1916 |
| 1,319,159 | Lord | Oct. 21, 1919 |
| 2,385,881 | Peterson | Oct. 2, 1945 |